Figure 1:
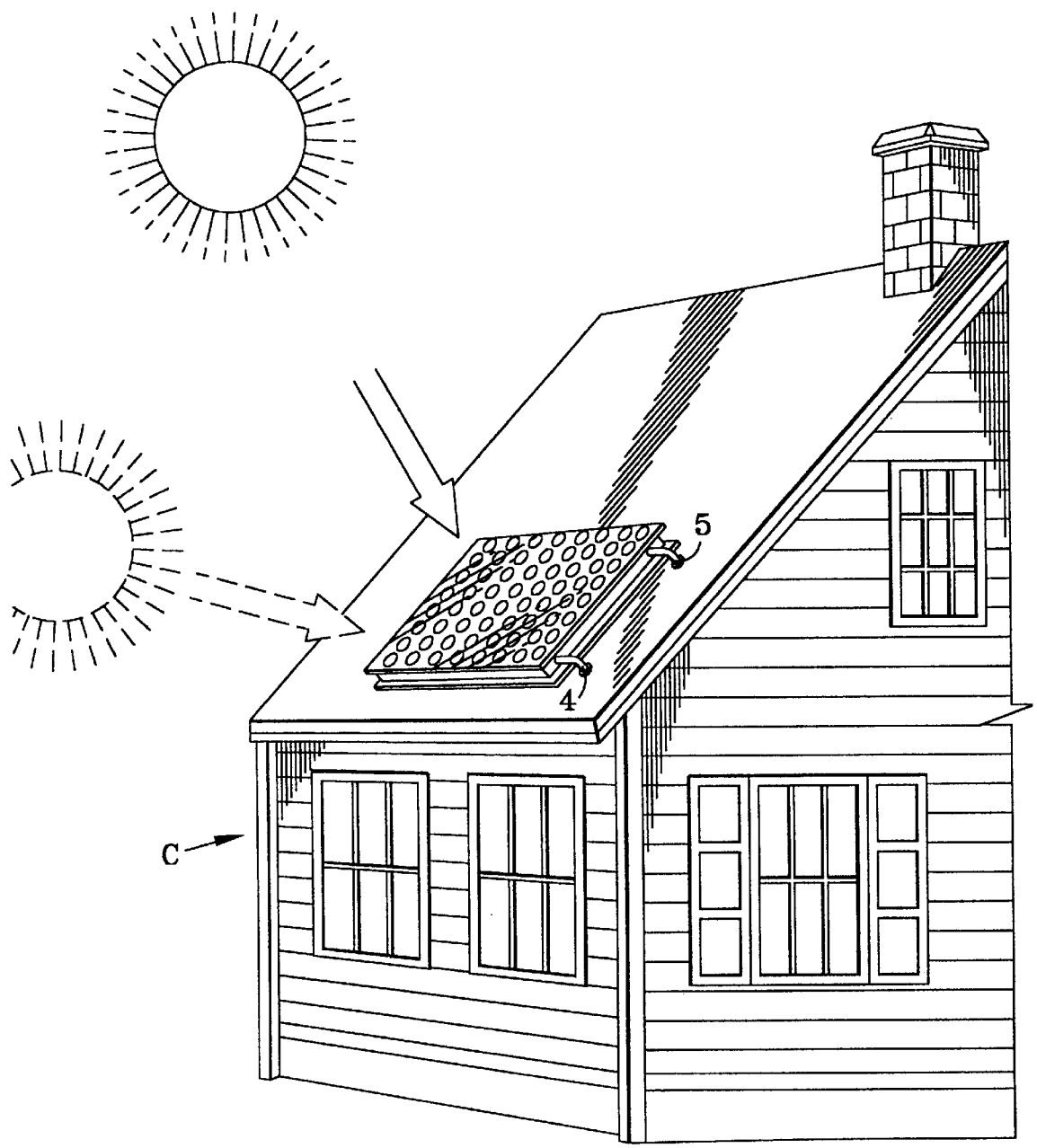

United States Patent

Rogers

[11] Patent Number: 5,941,239
[45] Date of Patent: Aug. 24, 1999

[54] MULTIPLE LENS SOLAR HEATING UNIT

[76] Inventor: Mark Rogers, R.R. #2, Box 597, North Bennington, Vt. 05257

[21] Appl. No.: 09/106,313
[22] Filed: Jun. 29, 1998
[51] Int. Cl.[6] .......................................................... F24J 2/08
[52] U.S. Cl. ........................... 126/698; 126/699; 126/700
[58] Field of Search .................................... 126/698–699, 126/700, 683

[56] References Cited

U.S. PATENT DOCUMENTS

| | | | |
|---|---|---|---|
| 2,277,311 | 3/1942 | Freeman | 126/640 |
| 2,382,722 | 8/1945 | Kezer | 126/698 |
| 4,137,899 | 2/1979 | Weslow | 126/699 |
| 4,566,434 | 1/1986 | Lindenbauer | 126/699 |

Primary Examiner—Larry Jones
Attorney, Agent, or Firm—John J. Welch, Jr., Esq.

[57] ABSTRACT

A multiple lens solar heating unit consisting of a piping component, a housing component with a transparent housing cap, holes within the housing component for entry and exit of the piping component, multiple lens mounting braces affixed parallel wise to inner walling of the housing component, a plurality of external lens holders mounted to the braces by mounting pins and rotatably pivotable in an XY plane, an equivalent plurality of internal lens holders mounted one each to each external lens holder by mounting pins and rotatably pivotable in an XZ plane and an equivalent plurality of magnifying lens mounted one each within each internal lens holder.

1 Claim, 6 Drawing Sheets

1

MULTIPLE LENS SOLAR HEATING UNIT

PRIOR, PARENT OR RELATED APPLICATIONS

There are no prior, parent or related applications in respect of the instant application.

FEDERALLY SPONSORED RESEARCH AND DEVELOPMENT

There is no federally sponsored research and development in connection with the instant invention.

BACKGROUND OF THE INVENTION

1. Field of the Invention

The instant invention is numbered amongst those devices that heat fluids by way of a resort to the utilization of solar power.

2. Other Art

The references set forth in the enclosed "Art Statement" depict devices which however do not anticipate the instant invention:

A SUMMARY OF THE INVENTION

1. A BRIEF DESCRIPTION OF THE INVENTION

The instant invention is meant to be mounted in the roof of a residential or commercial building. It consists of a piping component serving to conduct a liquid. The piping component emanating from within and back into the building, upon the roof of which the instant invention is located, is housed within a housing component characterized by the presence of a transparent housing cap affixed thereto which housing component is affixed to the roof of a building. A series of multiple lens holder mounting braces are affixed parallel wise to the inner walling of the lateral sides of the housing component. Pivotably mounted row wise to the anterior inner walling of the housing component and the most anteriorly affixed one of the mounting braces are a series of rotatable external lens holders. Pivotably mounted row wise to the posterior inner walling of the housing component and the most posteriorly affixed one of the mounting braces are a series of rotatable external lens holders. Pivotably mounted row wise to the remnant mounting braces, are a series of external lens holders as well. Pivotably mounted to each external lens holder is an internal lens holder. Each internal lens holder holds a magnifying lens. Each external lens holder is rotatable through an XY plane. Each internal lens holder is rotatable through an XZ plane.

2. OBJECTS OF THE INVENTION

Various forms of solar heating units have been utilized to heat water flowing through piping located upon the roofing of a building for purposes of heating up liquid such as water within piping conjoined thereto found within the building in order to heat the inside of the building or a reservoir of water within the building for the benefit of occupants of the building on sunny but chilly days. However, such devices suffer from certain marked limitations. The primary one of such limitations is a relative lack of focus of sun rays for any significant length of time on various portions of such piping with a result being that the liquid within the piping never gets so hot or for so long as to be able to meaningfully provide significant heat to the inside of the building for a prolonged period of time into dusk, then through the night and into the dawn. The instant invention serves to essentially obviate this limitation. It does so by virtue of the unique combination of a plurality of pivotably mounted lens unit, all adjusted positionally in recognition of the fact that the position of the sun in the sky in relation to the position of a building on a fixed foundation is constantly changing throughout the day. Each lens unit located above piping containing liquid is uniquely pre-positioned in such a manner that at any time of day, at least some of the lens are being directly impacted by solar radiation that is in turn maximally introduced via the lens to the piping below such that at any time of day, at least some of the liquid within the piping below all of the mounted lens becomes extremely hot and in turn raises the temperature of water within a certain section of the piping and in front of and likewise behind it. In this manner, solar power can be resorted to in order to very effectively heat the inside of a building.

In view of the foregoing, respectfully submitted, especially in this day and age of oftentimes unpredictable variability in both the price and availability of such heating means namely fuel sources such as oil or gas or energy sources such as electricity, the instant invention is not only new, useful and unique but is, for all intents and purposes, virtually revolutionary in the art of solar heating devices.

A DESCRIPTION OF THE DRAWINGS

1. FIG. 1 shows the intact instant invention mounted to a roof of a building on a sunny day with the position of the sun being dynamic during the day.

Figure 2:
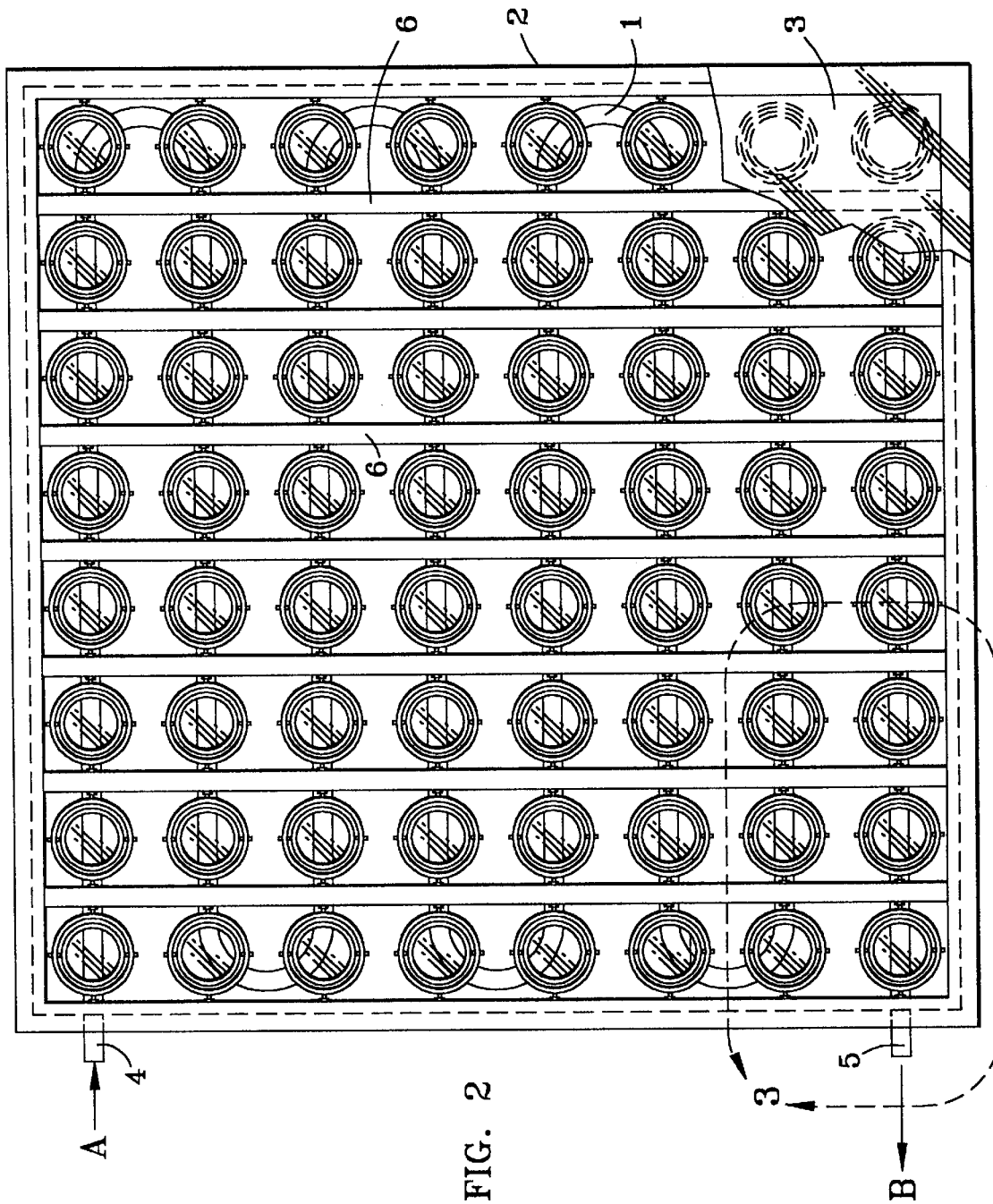

2. FIG. 2 is a top plan view of the intact invention with the transparent top side of the housing component, a housing cap thereof shown virtually all cutaway.

Figure 3:
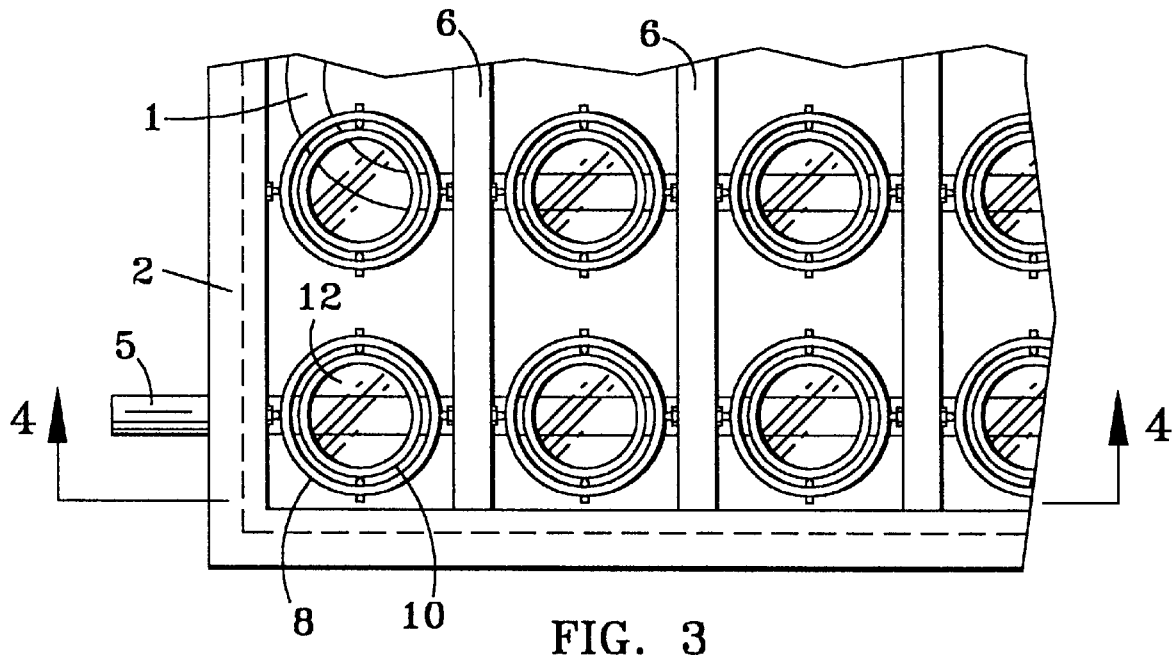

3. FIG. 3 is an isolated, enlarged partial top plan view of the lens' shown in the lower right side of FIG. 2.

Figure 4:
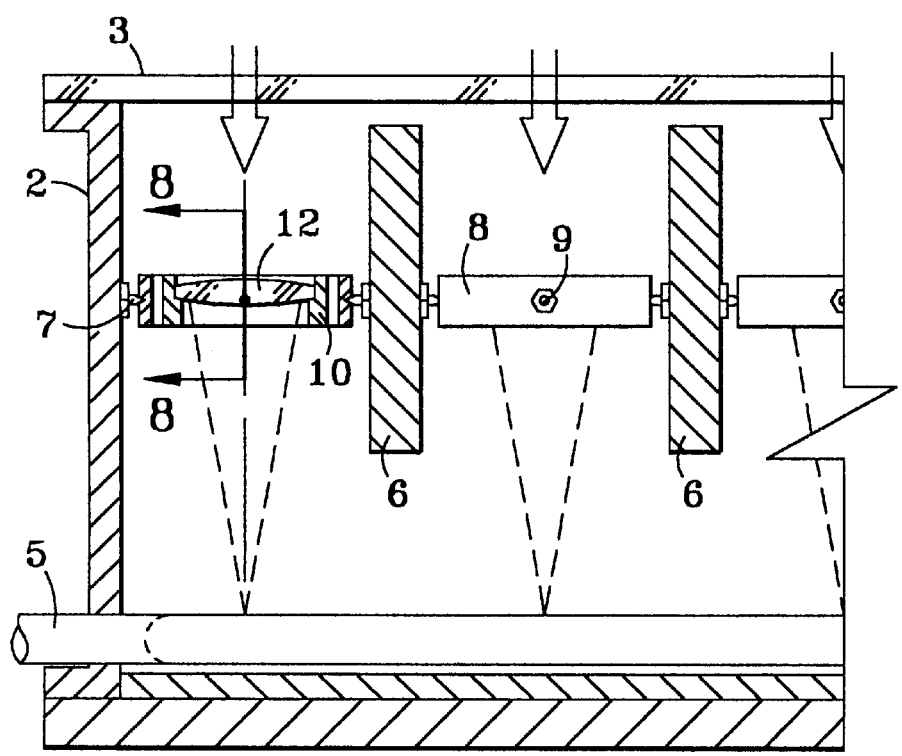

4. FIG. 4 is an isolated, enlarged vertically cut cross sectional view of the view in FIG. 3.

Figure 5:
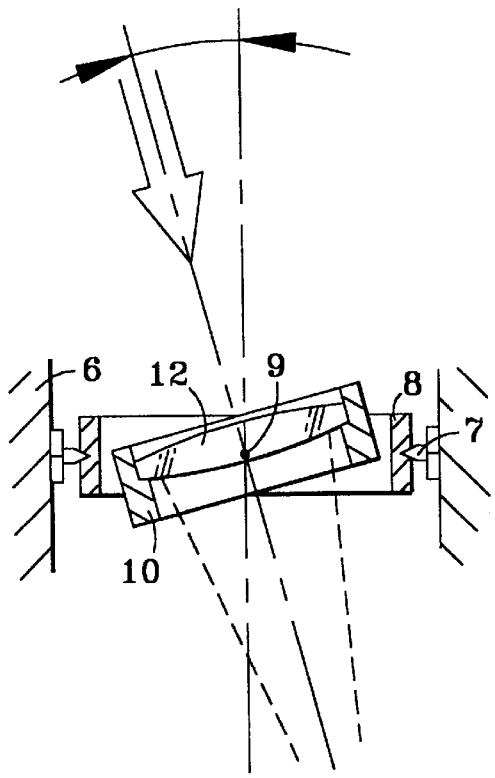

5. FIG. 5 an isolated cross-sectional view of a portion of what is initially seen, in FIG. 4 depicts the rotatability one way within an XZ plane of one of the internal lens holders of the instant invention.

Figure 6:
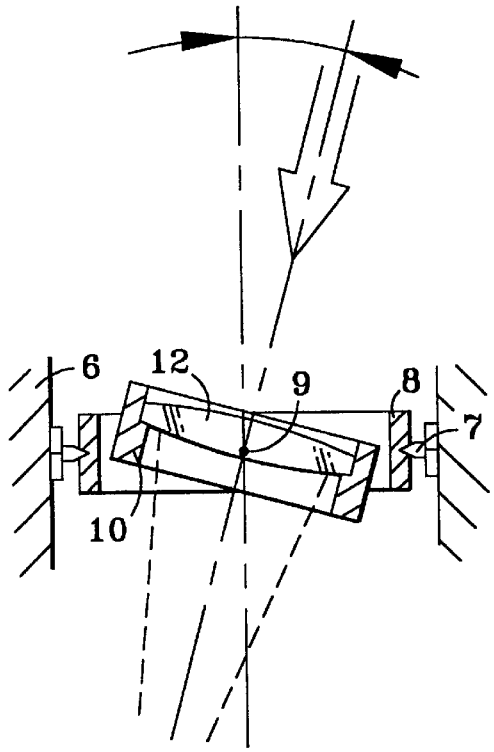

6. FIG. 6 an isolated cross-sectional view of a portion of what is initially seen in FIG. 4 depicts the rotatability the other way within an XZ plane of one of the internal lens holders of the instant invention.

Figure 7:
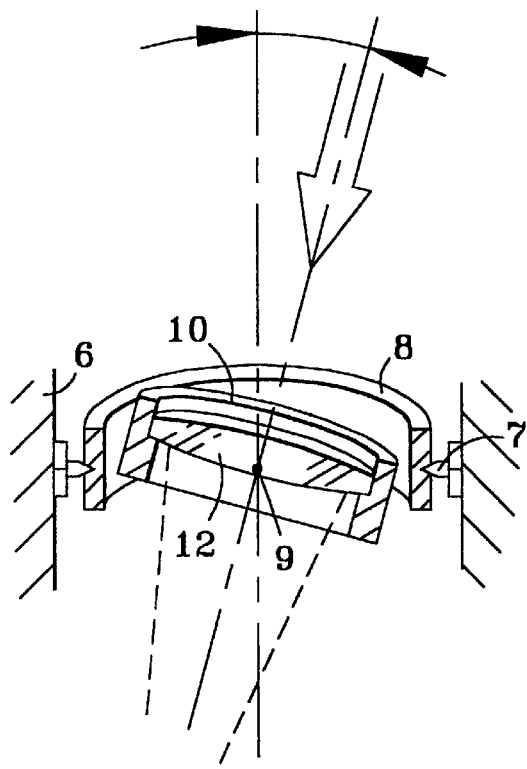

7. FIG. 7 depicts what is seen in FIG. 5 but illustrates the pivotable mounting of an internal lens holder within an external lens holder.

Figure 8:
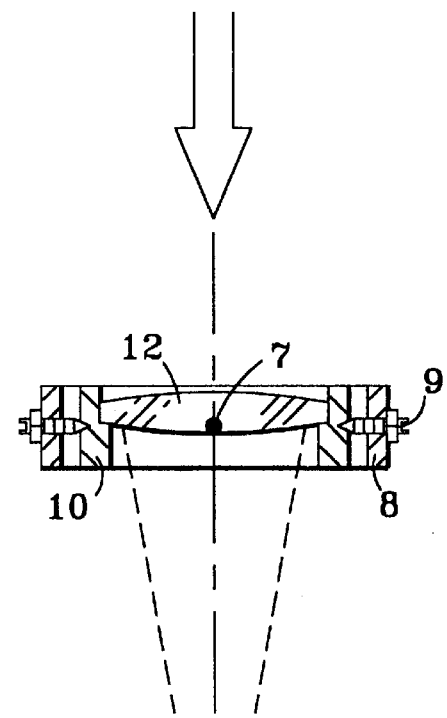

8. FIG. 8 is an isolated view of a magnifying lens as mounted within an internal lens holder.

Figure 9:
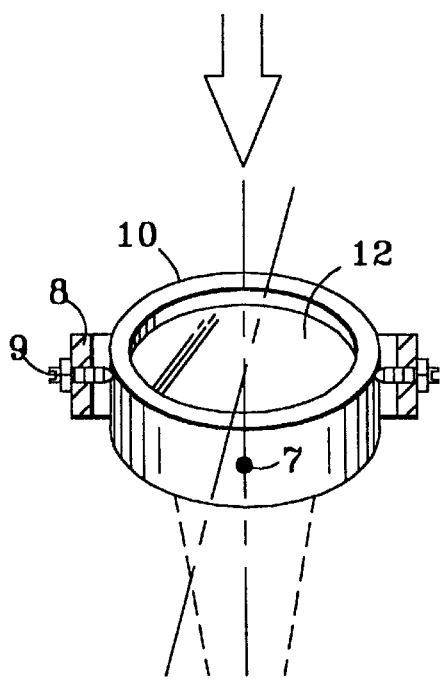

9. FIG. 9 illustrates the pivotability of an external lens holder within a XY plane.

Figure 10:
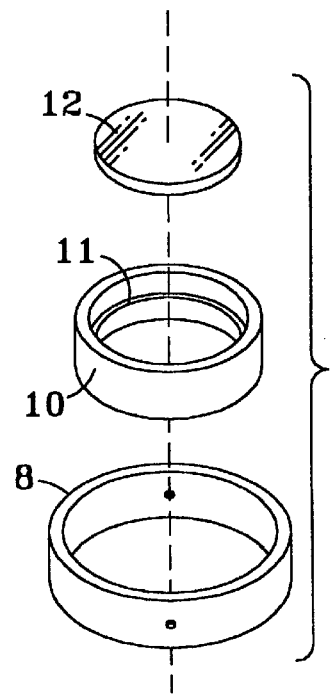

10. FIG. 10 is an exploded view of an external lens holder, internal lens holder and magnifying lens.

Figure 11:
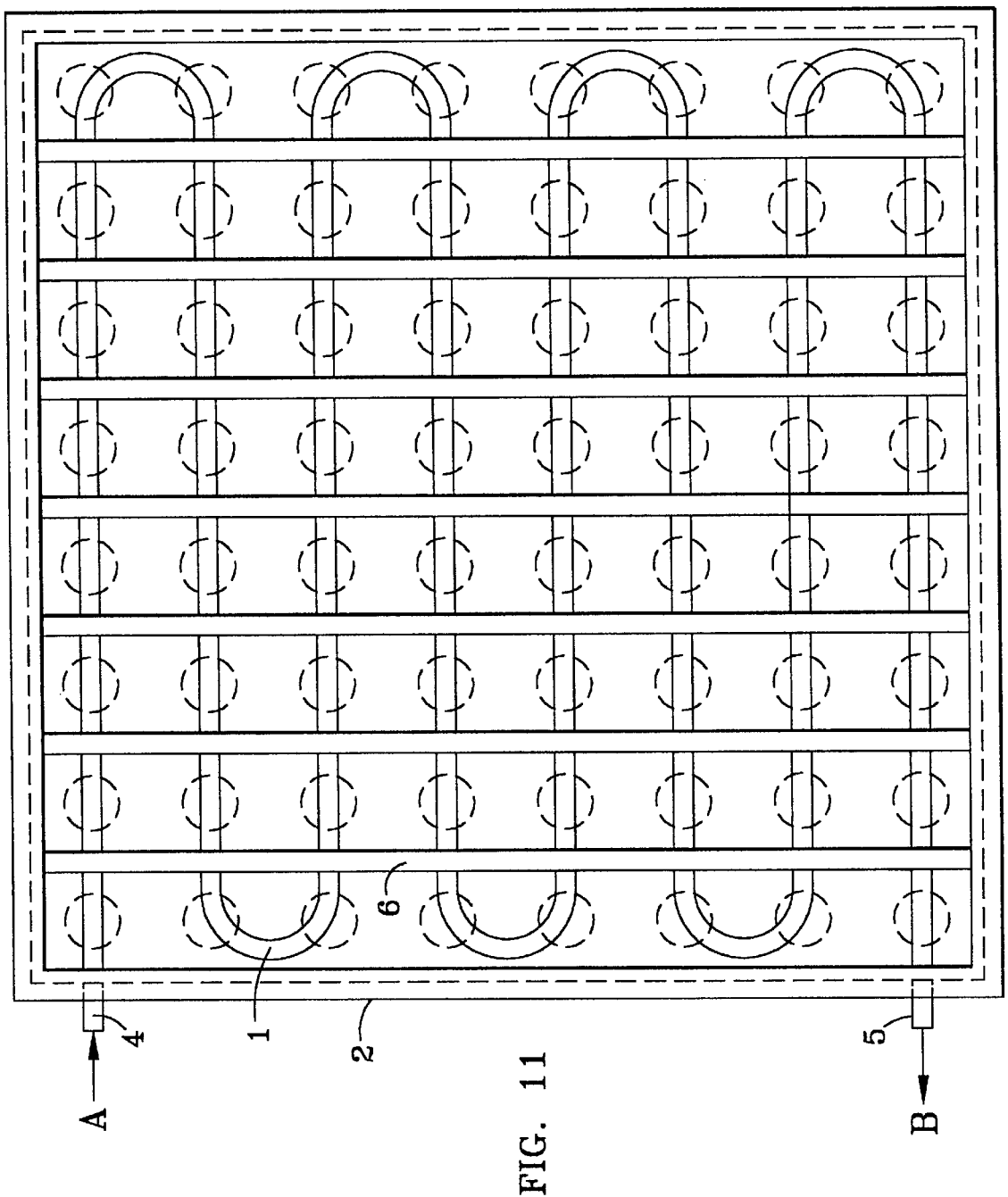

11. FIG. 11 is a top plan view of the piping component of the instant invention.

A DESCRIPTION OF THE PREFERRED EMBODIMENT

FIG. 1 illustrates the manner of mounting the intact instant invention to the roof of a house or industrial building C. FIG. 2 is a top plan view of a piping component 1 and a housing component 2. Housing component 2 is characterized by the presence of a removable transparent housing cap 3. In FIG. 1, there is also seen an entry hole 4, a through hole in a lateral side of housing component 2 for piping component 1 to enter housing component 2 at a point A seen in FIG. 2 from within the house or industrial building C, course along a lower portion of housing component 2 as illustrated in FIG. 11 —near to and parallel to a bottom side thereof and then exit from housing component 2 at a point B as also seen in FIG. 2 via exit hole 5, a second through hole in that lateral side of housing component 2 wherein entry hole 4 is found to threat reenter building C. Piping component 1 serves to conduct the flow of liquid, typically water to be used to provide heat and hot water within the house or industrial building C for the benefit of its occupants particularly from the advent of dusk on any given sunny day, then through the night and on into the termination of the next day's dawn. FIG. 2 depicts the multiple lens holder mounting braces 6 of the instant invention all mounted to inner walling of the respective lateral sides of housing component 2 with its transparent housing cap 3 which is seen in FIG. 2 shown virtually all cut away. Also seen in FIG. 2 and particularly in FIG. 3 are the plurality of external lens holders 8 each mounted row wise by a pair of suitable external mounting pins 7 to inner walling of an anterior side of housing component 2 and to an anteriormost one of multiple lens holder mounting braces 6. There is also a posterior row of external lens holders 8 that are all mounted by way of external mounting pins 7 to inner walling of a posterior side of housing component 2 and a posteriormost one of multiple lens holder mounting braces 6. There are moreover successive rows of external lens holder 8 similarly mounted to the above mentioned multiple lens holder mounting braces 6 and to other multiple lens holder mounting braces 6 located between them. As can be seen from a viewing of FIG. 4, each of external lens holders 8 by way of a pair of internal mounting pins 9 holds an internal lens holder 10; and, as can be seen from a viewing of FIG. 10, each internal lens holder 10 holds upon a seat 11 located therein an affixed magnifying lens 12. As can be seen with resort to FIG. 9, all of the various external lens holders 8 of the instant invention are rotatably pivotable upon external mounting pins 7 within an XY plane. Also, as can be seen with resort to FIGS. 5 and 6, all of the various internal lens holders 10 of the instant invention are pivotably rotatable upon internal mounting pins 9 within an XZ plane. FIGS. 7 and 8 also serve to illustrate such rotatably pivotable mounting of external lens holders 9 and internal lens holders 10.

It is the above-mentioned pivotal rotatability of external lens holders 8 in an XY plane and pivotable rotatability of internal lens holders 10 in an XZ plane that enables maximal focus of solar rays through certain of the magnifying lens 12 onto particular sectors of housed piping component 1 at varied given points in time on sunny days causing maximal heating of some sector of piping component 1 and therefore the liquid therein contained as the sun changes position in the sky throughout the day relative to the fixed position of the building equipped on its roof with the intact instant invention. Certain various external lens holders 8 are pre-rotated on external mounting pins 7 in the XY plane to a set position, and each internal lens holder 10 within each external lens holder 8 is pre-rotated on internal mounting pins 9 in the XZ plane to a set position as well. Other external lens holders 8 and other internal lens holders 10 are similarly so pre-rotated to somewhat different set positions with the net result of all such pre-rotation being that at any given time throughout a sunny day from dawn's end to early dusk, rays from the sun are maximally impacting a certain portion of liquid contained within piping component 1 so that the liquid within that certain portion is maximally heated. External mounting pins 7 and internal mounting pins 9 are sufficiently tightened in-situ so as to prevent passive drift through the XY plane of external lens holders 8 or through the XZ plane of internal lens holders 10 In other words, external lens holders 8 and internal lens holders 10 can be moved only by way of the force of adjustment by hand. The protective nature of transparent housing cap 3 that allows solar rays to pass through it to impact magnifying lens 12 serves to keep wind and the elements from impacting external lens holders 8 or internal lens holders 10. The ready removability of transparent housing cap 3 facilitates any interim adjustments that may have to occasionally be made in order to more readily ensure maximal impact of solar rays at any time during a sunny day on at least some portion of piping component 1 through some magnifying lens 12. It is such maximal impact at all times during a sunny day on at least some portion of piping component 1 and near maximal impact at all times on portions of piping component 1 before and after the maximally impacted portion of piping component 1 as exemplified by the solid arrows seen in FIGS. 1, 4 and 5–9 inclusive that serves to ensure maximal heating of the liquid within piping component 1 for the benefit of the inhabitants of building C. The broken arrow in FIG. 1 signifies maximal impact on a portion of piping component 1 at a point in time different than the point in time wherein maximal impact on a different portion of piping component 1 as illustrated by the unbroken arrow in FIG. 1 would be occurring. Depending upon the orientation of the sloping of a roof on a building C in relation to east—a rising sun and west—a setting sun, installation of a second intact invention on a second side of such roofing might well be indicated.

In conclusion, respectfully submitted, in view of the foregoing, from a vantage point of being able to best take advantage of solar radiation to heat a building C from dawn to dusk and to maximally keep it warm throughout the night without resort to other heat energy sources, the instant invention is not only new, useful and unique but is likewise indeed revolutionary in respect of the art of such devices.

What is claimed is:

1. A Multiple Lens Solar Heating Unit, comprising:
   a. a liquid conducting piping component conjoined and leading from piping within a building and conjoined to and leading to other piping within said building;
   b. a housing component circumscribing virtually the whole of said piping component;
   c. a first through hole within a lateral side of said housing component for entry of a first portion of said piping component into said housing component;
   d. said piping component being located near and running parallel to a bottom side of said housing component;
   e. a second through hole within said lateral side of said housing component for exit of an end portion of said piping component out of said housing component;
   f. said piping component traversing to and fro from said first lateral side of said housing component to near a second lateral side of said housing component within said housing component by way of curved end elbow portions thereof beginning with said first portion and terminating with said end portion;
   g. An anteriormost multiple lens mounting brace mounted to inner walling of said first lateral side of said housing component and inner walling of said second lateral side of said housing component;
   h. A posteriormost multiple lens mounting brace mounted to inner walling of said first lateral side of said housing component and inner walling of said second lateral side of said housing component;
i. a plurality of equivalent anterior external lens holders mounted row wise to inner walling of an anterior side of said housing component and to an anterior side of said anteriormost multiple lens mounting brace;
j. a plurality of equivalent posterior external lens holders mounted row wise to inner walling of a posterior side of said housing component and to a posterior side of said posteriormost multiple lens mounting brace;
k. a plurality of remnant multiple lens mounting braces mounted parallel to said anteriormost multiple lens mounting brace and parallel to said posteriormost multiple lens mounting brace and mounted to said inner walling of said first lateral side of said housing components and a said inner walling of said second lateral side of said housing component;
l. a plurality of equivalent remnant external lens holders mounted row wise to each of said multiple lens mounting braces such that each of said external lens holders is mounted to a back side of one of said remnant multiple lens mounting braces and to a front side of another one of said remnant multiple lens mounting braces;
m. paired mounting means for pivotably mounting said anterior external lens holders to said inner walling of said anterior side of said housing component and said anterior side of said anteriormost mounting brace;
n. paired mounting means for pivotably mounting said posterior external lens holders to said inner walling of said posterior side of said housing component and said posterior side of said posteriormost mounting brace;
o. paired mounting means for pivotably mounting said remnant external lens holders to said remnant multiple lens mounting braces;
p. a plurality of internal lens holders mounted one each within each of said anterior external lens holders, one each within each of said posterior external lens holders and one each within each of said remnant external lens holders;
q. second paired mounting means for pivotably mounting said internal lens holders to said anterior external lens holders, said posterior external lens holders and said remnant external lens holders;
r. a lens holding seat located within each said internal lens holder;
s. a magnifying lens positioned upon each said lens holding seat within each said internal lens holder;
t. a removable transparent housing cap affixed to top edges of said anterior side, said first lateral side, said posterior side and said second lateral side of said housing component;
u. said anterior external lens holders, said posterior external lens holders and said remnant external lens holders being pivotably rotatable about said paired mounting means in an XY plane;
v. said internal lens holders being pivotably rotatable about said second paired mounting means in an XY plane, and;
w. said anteriormost multiple lens mounting brace, said posteriormost multiple lens mounting brace and said remnant multiple lens mounting braces being located within said housing component between the location therein of said piping component and the location of said removable transparent housing cap.

\* \* \* \* \*